United States Patent [19]
Ghestem

[11] 4,110,915
[45] Sep. 5, 1978

[54] MANUFACTURE OF CEMENT
[75] Inventor: Gerard Ghestem, Lambersart, France
[73] Assignee: Fives-Cail Babcock, Paris, France
[21] Appl. No.: 750,230
[22] Filed: Dec. 13, 1976
[30] Foreign Application Priority Data
Dec. 12, 1975 [FR] France ............................. 75 38049
Sep. 28, 1976 [FR] France ............................. 76 29040
[51] Int. Cl.² ........................... F26B 7/00; F27B 7/02
[52] U.S. Cl. ......................................... 34/20; 34/62;
106/100; 432/18; 432/78; 432/106
[58] Field of Search ...................... 432/18, 77, 78, 106;
34/20, 62; 106/100

[56] References Cited
U.S. PATENT DOCUMENTS

| | | | |
|---|---|---|---|
| 2,375,487 | 5/1945 | Newhouse | 432/78 |
| 3,273,255 | 9/1966 | Kramer | 34/20 |
| 3,891,383 | 6/1975 | Kobayashi | 432/106 |
| 3,922,797 | 12/1975 | Dick | 34/20 |

*Primary Examiner*—John J. Camby
*Attorney, Agent, or Firm*—Kurt Kelman

[57] ABSTRACT

Clinker coming from a rotary tubular kiln is cooled by moving a layer of the clinker of a grate in a cooler from a hot zone to a successively cooler zone by introducing fresh air in the cooler zone and passing in countercurrently through the layer of the clinker several times whereby a heat exchange takes place between the air and the clinker, the clinker becoming successively cooler and the air successively hotter. The air is introduced from the cooler zone sequentially into two sections of the hot zone, air at a temperature above 1000° C is removed from a first section in the hot zone, and air at a lower temperature is conducted from the second section in the hot zone into the kiln where it is used as secondary heating air for the raw material therein.

16 Claims, 9 Drawing Figures

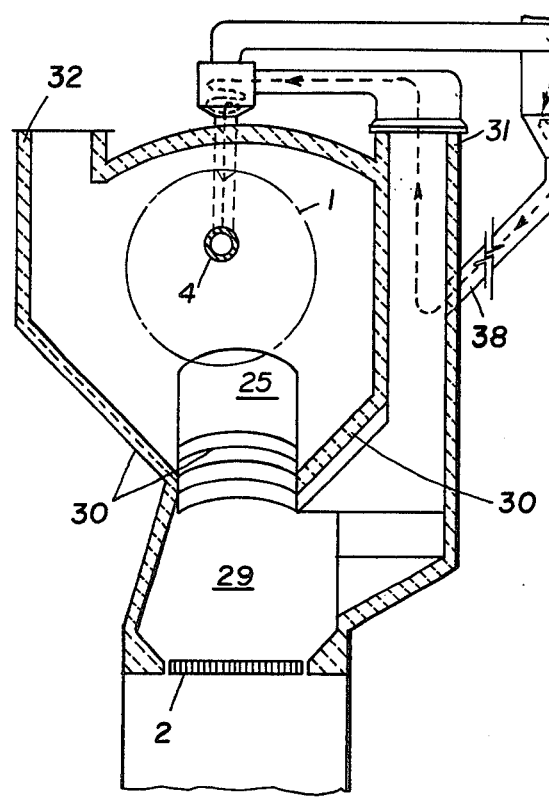
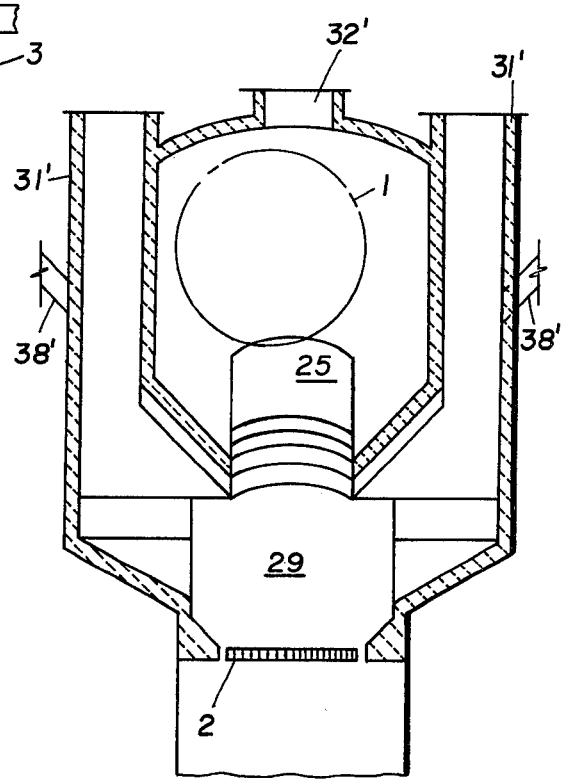
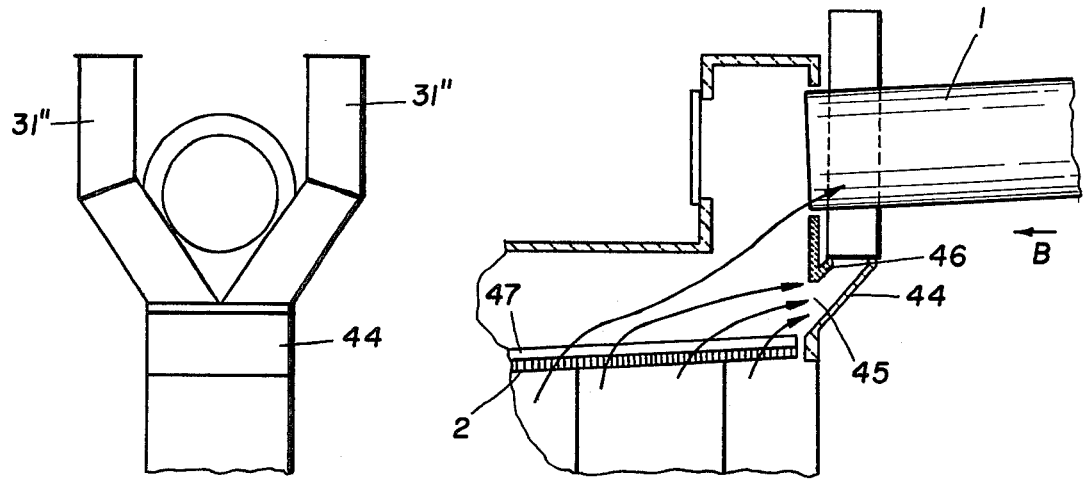
FIG. 5  FIG. 6  FIG. 8  FIG. 9

MANUFACTURE OF CEMENT

The present invention relates to the manufacture of cement from a raw material which is converted to clinker in a rotary tubular kiln. In known manufacturing processes and installations of this type, the raw material is preheated by exhaust fumes coming from the kiln and the preheated raw material is delivered to the kiln, a calcination chamber being arranged in the path of the preheated raw material to the kiln, if desired, and the clinker discharged from the kiln is cooled on a grate in a cooling zone receiving the discharged clinker by fresh air supplied thereto and subsequently used as secondary heating air in the kiln and, if desired, the calcination chamber.

In conventional installations, the amount of required secondary air is not sufficient to assure cooling of the clinker and, therefore, it is necessary to use in the cooling zone an excess amount of fresh air which is then exhausted to the atmosphere or recycled after having been cooled by indirect heat exchange with cold air.

To reduce the calorific consumption in such installations by a better recovery of the heat of the clinker and to avoid exhaustion of the dust-laden air into the ambient atmosphere after it has cooled the clinker, it has been proposed to remove air at a high temperature from the hot zone of the cooling zone and to deliver it either to a boiler or to a heat exchanger where it transmits its calories to a fraction of the raw material while the cold air is recycled in the cooler. In such installations, the air is removed from the hood of the kiln at the discharge end of the clinker, the hood being connected directly to the cooler and the temperature of the air being the same as that of the air conducted into the kiln. But this temperature must be limited to a range of about 850° C to 900° C if problems of maintaining the mechanical joint between the hood and kiln are to be avoided, as well as problems with the refractory lining of the conduit delivering the air into the kiln.

It is the primary object of this invention to improve the efficiency of cement manufacture in processes and installations of the indicated type, by increasing the temperature of the air removed from the hot zone of the cooler and recirculating air in the cold zone thereof.

The above and other objects are accomplished according to the process of the invention by moving a layer of the discharged clinker on the grate in the cooling zone from a hot zone to a successively cooler zone, introducing fresh air in the cooler zone, and passing the introduced fresh air countercurrently through the layer of the clinker several times whereby a heat exchange takes place between the air and the clinker. The air is subsequently introduced from the cooler zone sequentially into two chambers of the hot zone, air is removed at a temperature in excess of 1000° C from a first chamber of the hot zone, and air at a lower temperature is conducted from a second chamber of the hot zone into the kiln to be used therein as secondary heating air.

The installation of the present invention comprises a rotary tubular kiln for converting raw material to clinker. The kiln has a discharge end for the clinker, a cooler for the clinker is arranged to receive the discharged clinker from the kiln, the cooler including a grate receiving and supporting a layer of the discharged clinker, and a hood connects the discharge end of the kiln to the cooler. The cooler further includes a housing connected to the hood, means for supplying fresh air to an end of the cooler housing remote from the discharge end of the kiln and for passing the air several times through the grate and layer of clinker in a direction from the remote to the discharge end whereby the air becomes successively hotter in heat exchange with the clinker, means for conducting a portion of the hotter air into the kiln for use as secondary heating air therein, and discharge port means in the housing around the discharge end of the kiln and above the layer of clinker on the grate for removing the hottest air.

The above and other objects, advantages and features of the present invention will become more apparent from the following detailed description of certain now preferred embodiments, taken in conjunction with the accompanying drawing wherein FIG. 1 is a side elevational view of one embodiment of the downstream portion of an installation according to this invention, the cooler being shown in section;

FIG. 5 shows a vertical section of the hood of the kiln and of the cooler of the installation of FIGS. 1 to 4;

FIG. 6 is a view analogous to that of FIG. 5, showing another embodiment;

FIG. 8 is an end view of an embodiment of the upstream portion of the cooler and of the hood of the kiln which is attached thereto, seen in the direction of arrow B of FIG. 9; and FIG. 9 is a side elevational view of the assembly of FIG. 8, partly in section.

Figure 1:
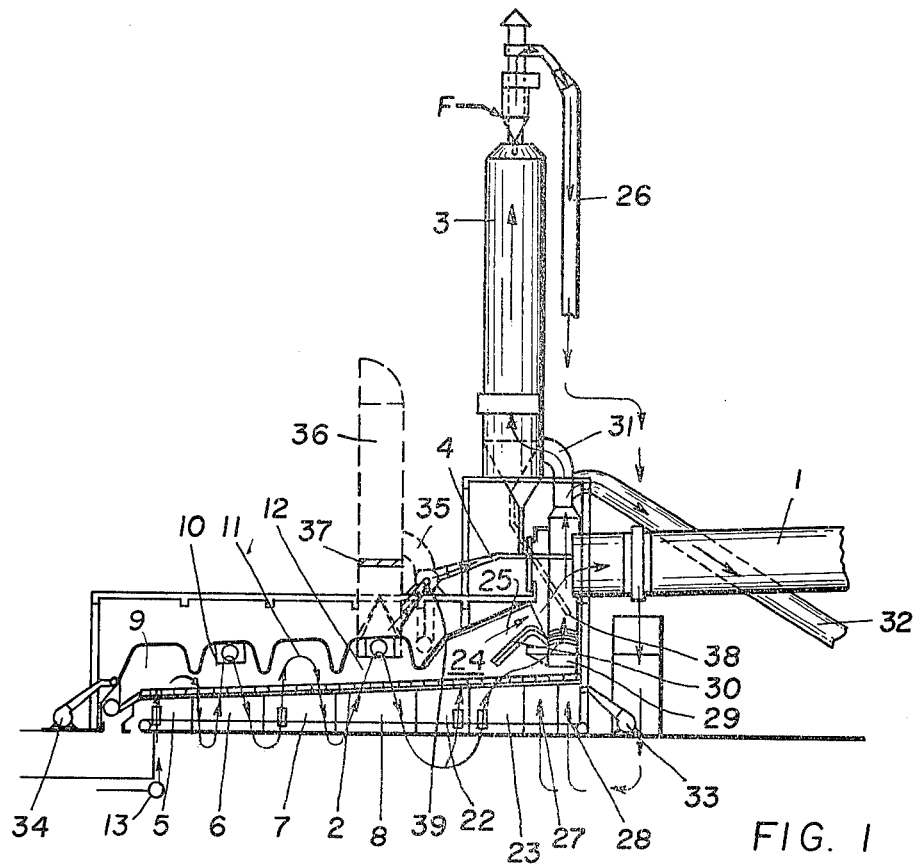
Figure 2:
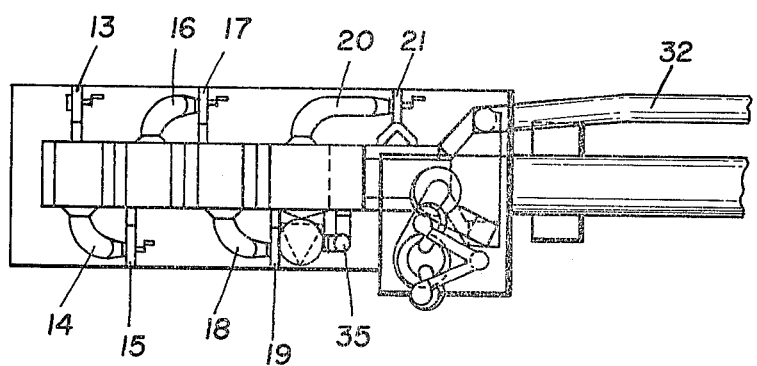
FIG. 2 is a plan view of FIG. 1.

Referring now to the drawing, and first to FIGS. 1 and 2, the illustrated portion of the cement drying installation comprises tubular rotary kiln 1, a cooler for the clinker coming from the kiln and heat exchanger 3 associated with the cooler, the preheater and calcination chamber for the cement upstream of the kiln not being shown.

The cooler for the clinker comprises grate 2 which is slightly inclined with respect to the horizontal and enclosed in a housing which may be of sheet metal and is not lined with bricks. The space below grate 2 is divided into compartments 5, 6, 7 and 8, which are aligned with sections 9, 10, 11 and 12 above the grate, and compartments 22, 23, 27 and 28, which are aligned with sections 24 and 29 above the grate. Compartments 22, 23, 27 and 28, with their associated sections 24 and 29, constitute the hot zone of the cooler designated in FIG. 7 as "removal zone" because the secondary air for the kiln and calcination chamber is removed from this zone. The portion of the cooler comprised of compartments 5 to 8 and sections 9 to 12 is the cold zone of the cooler designated in FIG. 7 as "recycling zone" because the same volume of air traverses the clinker layer there several times. The average temperature in the cold zone does not exceed 500° C.

The sections above grate 2 are separated by folds in the sheet metal housing which is cooled by the circulation of fresh air through a jacket surrounding the housing or through tubes affixed thereto. This fresh air is blown in by ventilator 34 and escapes through pipe 35 leading into exhaust flue 36.

As shown in FIG. 2, fresh air is blown into compartment 5 by ventilator 13 to traverse grate 2 and the layer of clinker supported thereon whence it enters chamber 9 from which it is exhausted through pipe 14 by ventilator 15. While the input of the ventilator is connected to pipe 14, the output of ventilator 15 is connected to compartment 6 which receives the air. There, the air again passes through the grate and clinker to enter section 10 whence it is exhausted through pipe 16 by ventilator 17 which blows the air into compartment 7. The air now passes once more through the grate and clinker and leaves section 11 through pipe 18 whence ventilator 19 blows the air into compartment 8 whence it is exhausted through pipe 20 by ventilator 21 which blows the air into compartments 22 and 23 which are in communication with each other. The meandering flow path of the air passing through the compartments and sections below and above grate 2 is shown by arrows in FIG. 1.

If desired, fresh air may be mixed with the air sucked in by ventilator 21 so that the air blown into compartments 22 and 23 does not exceed a temperature of about 250° C.

The repeated passages of the air across the layer of clinker permit a maximum recovery of calories and the average temperature of the air in section 24 is around 700° C.

Section 29, where the temperature is very high, is separated from the hood of the kiln by hopper 30 whose walls are constituted by arches of refractory material. The hopper has an opening in registry with the chute delivering the clinker from the discharge end of kiln 1 and the opening is so dimensioned that it just permits passage of the clinker for deposit on grate 2 so as to avoid any substantial flow of air from section 29 towards the hood of the kiln.

Air at a very high temperature, of the order of 1200° C, is removed from section 29 through a port in a lateral wall of the cooler housing just above the layer of clinker and is conducted to an inlet of heat exchanger 3 through flue 31, as also shown by arrows in FIG. 1, which indicate the flow path of the air. This hot air is utilized to heat and at least partially to decarbonize a fraction of the raw material, of the order of 15% thereof. The heat exchanger comprises a lower cyclone, a counter-currently operating heat exchange tower and two upper cyclones connected in parallel.

As again shown by arrows, the air leaving heat exchanger 3 through conduit 26 is introduced into compartments 27 and 28 by a ventilator (not shown).

A small amount of very hot air passes through the opening in hopper 30 from section 29 into the hood of the kiln where it is mixed with the air of somewhat lower temperature coming from section 24 and conducted by conduit 25 constituted by a tunnel connecting the housing of the cooler with the hood and by an arch of refractory material which is supported on the lateral walls of the housing and attached to hopper 30, as indicated by arrows. This mixture of air, which has a temperature of the order of 800° C, is distributed between the kiln and the calcination chamber (not shown) connected to the hood of the kiln by conduit 32, as indicated by arrows.

In the illustrated embodiment, an additional ventilator 33 feeds fresh air to compartment 28 if this appears to be necessary to cool the clinker more effectively in the zone of the delivery chute.

Exhaust chimney 36, which is mounted on section 12, permits blowing a large amount of air by ventilators 13, 15, 17 and 19, and to evacuate a portion to the atmosphere, in case of need. During normal operation, register 37 in chimney 36 is closed and no air is exhausted. The yield of the cooler is then at a maximum. If it is desired to reduce the temperature at the outlet of the cooler, the flow of fresh air blown into compartment 5 may be increased and a little air may be exhausted through chimney 36. The amount of exhausted air will be decreased in direct proportion to the increase in the number of recirculations in the recycling zone.

Figure 3:
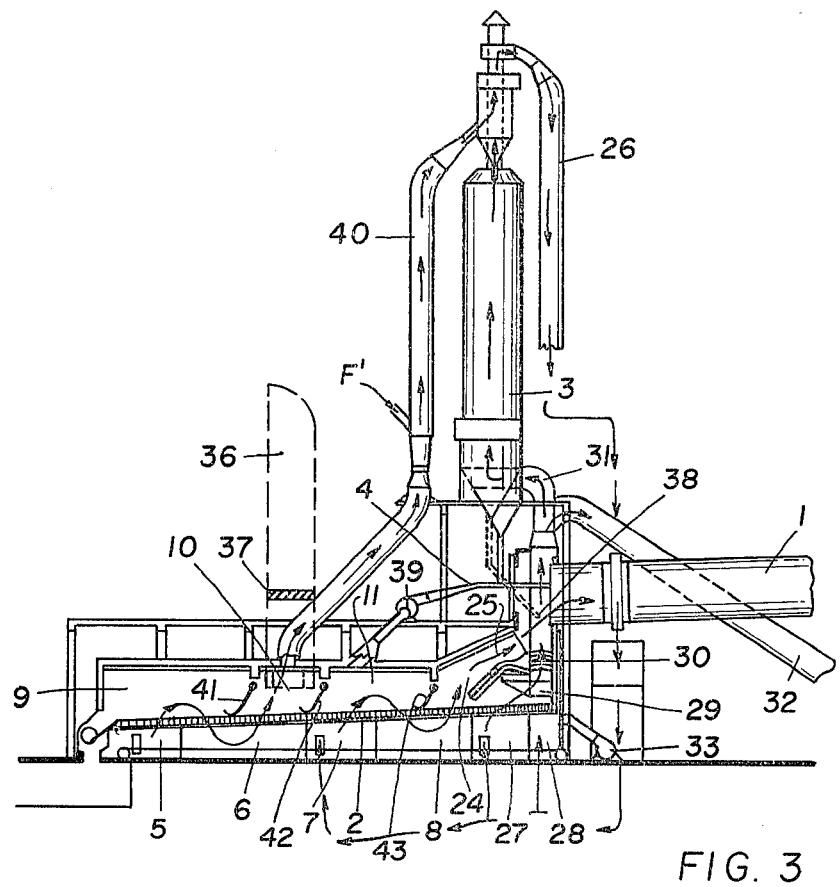
FIGS. 3 and 4 are views analogous to those of FIGS. 1 and 2, showing another embodiment.
Figure 4:
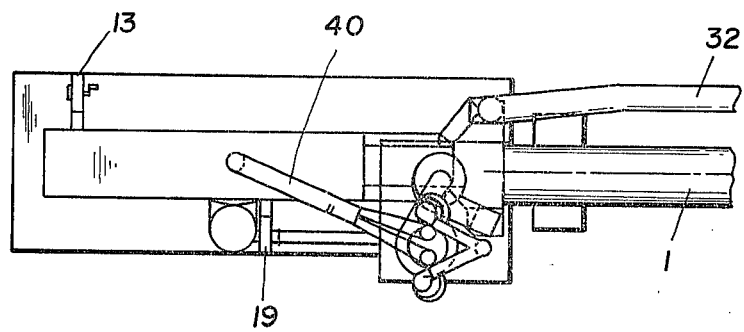

In the embodiment of the installation shown in FIGS. 3 and 4, like reference numerals designate like parts functioning in a like manner as in the above-described embodiment.

In this embodiment, the recycling zone of the clinker cooler comprises only three sections 9, 10 and 11, compartment 6 being associated with sections 9 and 10 while compartment 8 is common to sections 11 and 24. In other words, section 12 and compartments 22 and 23 are omitted. Sections 9, 10, 11 and 24 are separated from each other by steel or iron shutters 41, 42 and 43 which are pivotal at their upper ends about horizontal axes and whose lower edges rest on the layer of clinker. These shutters extend over the entire width of grate 2 and are constituted by separate elements permitting the passage of a block without entirely destroying the fluid tightness.

Fresh air blown into compartment 5 by ventilator 13 passes through grate 2 and the clinker, enters into section 9, passes in the other direction through the clinker layer and the grate to enter into compartment 6, and then passes a third time through the grate and the clinker into section 10. This air, whose temperature is now about 200° C, is then drawn by a ventilator into the heat exchanger and carried by conduit 40 to the inlet of the upper cyclones of heat exchanger 3.

The raw material is introduced into the heat exchange at F' in conduit 40 and is pneumatically conveyed to the upper cyclones. The air leaving the heat exchanger is drawn by a non-illustrated ventilator and blown by ventilator 19 into compartments 7, 27 and 28. If desired, fresh air may be admixed to the air coming from the heat exchanger. The air introduced into compartment 7 passes the grate and clinker to enter section 11, then traverses the clinker and grate in the opposite direction and enters compartment 8 whence it passes into section 24 after having traversed the grate and clinker a third time. This manner of air circulation permits, on the one hand, a reduction of the number of ventilators and, on the other hand, eliminates the problem of abrasion of ventilator blades by the dust of the clinker. As in FIG. 1, the flow path of the air has been indicated by arrows in FIG. 3.

As in the embodiment of FIGS. 1 and 2, hot air removed from section 29 at a temperature of the order of 1200° C is utilized in the heat exchanger to treat a fraction of the raw material. A small amount of hot air passes from section 29 into the hood of the kiln where it is mixed with air coming from section 24, and this air mixture is used as secondary air in the kiln and the calcination chamber.

In this installation, the exhaust chimney is mounted on section 10 and the air serving to blow the raw material into the kiln by pipe 4 is removed from section 11 by ventilator 39.

FIG. 5 shows the assembly of the hood of the kiln and the cooler housing of FIGS. 1 to 4 in vertical section, the flow path of the raw material in the lower part of the preheater being indicated in broken lines. As indicated in FIG. 1, the raw material is introduced at F in the upper cyclones of heat exchanger 3 and, on leaving these cyclones, is introduced into the heat exchanger tower through which it moves to the base of the tower whence it is conducted by pipe 38 into flue 31 and another cyclone. The material leaving the lower cyclone is blown into the kiln by pipe 4 by means of air removed from section 12 by ventilator 39.

FIG. 6 illustrates another embodiment of this assembly in the same view. In this embodiment, the hot air utilized in the heat exchanger is removed from section 29 through two ports in the lateral walls of the cooler housing just above the layer of clinker on grate 2, the ports leading into two flues 31' symmetrically disposed with respect to a median plane of the cooler. Conduit 32' connects the hood of the kiln to the calcination sections and its inlet connected to the hood is arranged in the plane of symmetry.

Figure 7:
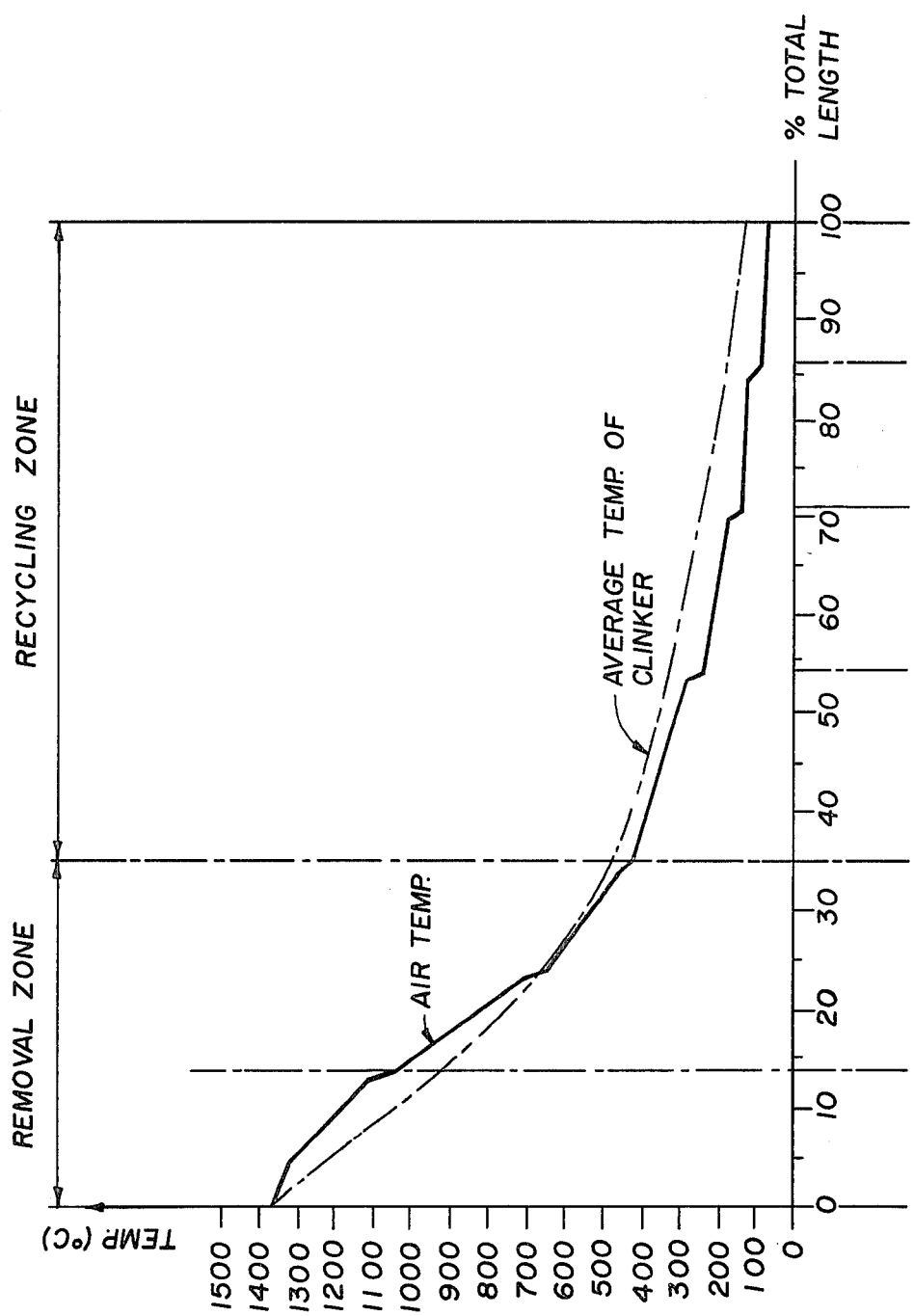
FIG. 7 is a graph showing the evolution of the temperatures of the air and the clinker along the cooler.

FIG. 7 shows, by way of example, the curves of the variation of the temperatures of the air and of the clinker along the length of grate 2 of the cooler in the installation of FIGS. 1 and 2. The abscissa indicates the percentage of the total length of the grate, beginning at the point of the chute delivering the clinker from the kiln to the grate. The limits of the compartments and chambers are indicated in chain-dotted lines. In the given example, the yield of recovery of the cooler is of the order of 89% and the total recovery in the installation, i.e. the reduction in consumption with respect to conventional installations, is at least 60 Kcal per kilogram of clinker.

In the embodiment of FIGS. 8 and 9, discharge port 45 for the removal of hot air is provided in front wall 46 of the cooler housing just above the layer of clinker 47 on grate 2. The discharge port may extend over the entire width of the grate. This port is connected to hood 44 which leads into a pair of symmetrically arranged flues 31'' on respective sides of kiln 1.

The present invention may also be used in installations without a heat exchanger associated with the cooler for the clinker. In this case, the amount of air supplied by ventilator 13 is somewhat increased and a corresponding amount of air is exhausted. Alternatively, the same amount of fresh air may be supplied and no air is exhausted while the number of recirculations in the recycling zone is increased. The volume of section 29 is then increased and the very hot air is removed therefrom to be delivered to the calcination chamber upstream of the kiln. Flue 32 will then be omitted. In this case, the secondary air for the kiln will be kept at a temperature of 800° C to avoid problems posed by the other embodiments and to feed to the calcination chamber much hotter air of a temperature up to 1100° C. This produces a yield of the cooler of the order of 85% and the total yield increase of the installation is in the neighborhood of 60 Kcal per kilogram of clinker.

What is claimed is:

1. A process of manufacturing cement, wherein raw material is converted to clinker in a rotary tubular kiln and the clinker is discharged from the kiln through a hood onto a grate in a cooler, the cooler including a housing connected to the hood, means for supplying fresh air into the cooler housing at one end thereof, and means for conducting different portions of the air from the cooler housing, comprising the steps of
    (a) moving a layer of the clinker discharged from the kiln on the grate in the cooler housing from a hot zone to an increasingly cooler zone,
    (b) supplying the fresh air in the cooler zone at the one end remote from another end of the cooler housing wherein the clinker is discharged,
        (1) the layer of the clinker being moved on the grate from the other end of the one end of the cooler housing,
    (c) passing the fresh air countercurrently through the layer of the clinker several times from the one end to the other end whereby a heat exchange takes place between the air and the clinker and the temperature of the air progressively increases,
    (d) subsequently introducing the air from the cooler zone into two sections of the hot zone,
    (e) conducting one of the portions of the air at a temperature in excess of 1000° C from a first one of the sections of the hot zone out of the cooler housing, and
    (f) conducting another air portion at a lower temperature from the second hot zone section into the kiln for use as secondary heating air in the kiln.

2. The cement manufacturing process of claim 1, comprising the further steps of conducting the one air portion into heat exchange contact with a fraction of the raw material for preheating the raw material fraction, and then returning the one air portion back into the hot zone.

3. The cement manufacturing process of claim 1, comprising the further step of calcining the raw material by heat exchange contact with the one air portion.

4. The cement manufacturing process of claim 1, further comprising the step of mixing a major amount of the air at a lower temperature with a minor amount of the air at a temperature in excess of 1000° C, and conducting the air mixture into the kiln to be used therein as secondary heating air.

5. An installation for the manufacture of cement from raw material, comprising
    (a) a rotary tubular kiln for converting the raw material to clinker, the kiln having a discharge end for the clinker,
    (b) a cooler for the clinker arranged to receive the discharged clinker from the discharge end of the kiln, the cooler including
        (1) a grate receiving and supporting a layer of the discharged clinker,
    (c) a hood connecting the discharge end of the kiln to the cooler, the cooler further including
        (1) a housing connected to the hood at one end of the housing,
        (2) means for supplying fresh air into the cooler housing at another end thereof remote from the discharge end of the kiln,
        (3) means for forcing the air supplied into the housing several times through the grate and the layer of clinker thereon in a direction from the remote end to the one end of the housing whereby the air becomes progressively hotter in heat exchange with the clinker, and
        (4) discharge port means in the housing at the one end adjacent the discharge end of the kiln and above the layer of the clinker for removing the hottest air from the housing, the discharge port means being arranged to conduct the hottest air away from the kiln connected by the cooler housing by the hood.

6. The installation of claim 5, further comprising a separating wall between the hood of the kiln and the clinker discharge end thereof, the separating wall defining an opening of a dimension permitting the discharged clinker to drop onto the grate while preventing any substantial amount of the hottest air to escape there-through, the separating wall dividing the hot zone of the cooler adjacent the discharge end of the kiln into a first section having the discharge port means and a second section downstream of the first section in the direction of movement of the clinker on the grate, the second section being in communication with the hood of the kiln.

7. The installation of claim 6, wherein the separating wall is constituted by a hopper whose walls are arches of refractory material.

8. The installation of claim 6, wherein the second section is in communication with the hood of the kiln through a tunnel connecting the cooler housing to the hood, the tunnel being constituted by an arched wall supported on the housing and connected to the separating wall.

9. The installation of claim 5, wherein the housing of the cooler defines at least three successive chambers adjacent the remote end, the successive chambers being in communication for permitting the fresh air supplied to the remote end to pass successively therebetween before it is passed to a hot zone adjacent the discharge end of the clinker.

10. The installation of claim 9, further comprising folds in the cooler housing wherebetween the successive chambers are defined.

11. The installation of claim 9, further comprising shutters pivotal about a horizontal axis and having a lower edge in contact with the layer of clinker on the grate for defining the successsive chambers therebetween.

12. The installation of claim 9, further comprising an exhaust chimney mounted on one of the chambers for removing air therefrom.

13. The installation of claim 5, wherein the cooler housing has lateral walls and the discharge port means consists of ports in the lateral walls.

14. The installation of claim 5, wherein the cooler housing has a front wall adjacent the discharge end and the discharge port means consists of ports in the front wall.

15. The installation of claim 5, further comprising a heat exchanger, means for delivering a fraction of the raw material to the heat exchanger, means for conducting the hottest air removed through the discharge port means into the heat exchanger wherein the fraction of the raw material is subjected to said air, and means for returning at least a portion of the air discharged from the heat exchanger to the cooler below the grate adjacent the discharge end of the kiln.

16. The installation of claim 15, further comprising pneumatic means for delivering the fraction of the raw material to the heat exchanger, the pneumatic means being supplied with air removed from the zone of the cooler adjacent the remote end thereof, and means for returning a fraction of the air discharged from the heat exchanger to the cooler below the grate adjacent the remote end.

* * * * *